US 6,533,458 B2

(12) United States Patent  
Itabashi

(10) Patent No.: US 6,533,458 B2
(45) Date of Patent: Mar. 18, 2003

(54) LINEAR MOTION GUIDE UNITS WITH SEPARATOR COUPLERS

(75) Inventor: Shigemasa Itabashi, Kanagawa-ken (JP)

(73) Assignee: Nippon Thompson Co., Ltd., Tokyo (JP)

(*) Notice: Subject to any disclaimer, the term of this patent is extended or adjusted under 35 U.S.C. 154(b) by 0 days.

(21) Appl. No.: 09/973,882

(22) Filed: Oct. 11, 2001

(65) Prior Publication Data

US 2002/0044703 A1 Apr. 18, 2002

(30) Foreign Application Priority Data

Oct. 18, 2000 (JP) .......................... 2000-317552

(51) Int. Cl.$^7$ .............................................. F16C 29/06
(52) U.S. Cl. ............................................................... 384/45
(58) Field of Search ............................. 384/45, 43, 44; 464/168

(56) References Cited

U.S. PATENT DOCUMENTS 6,102,572 A    8/2000   Hidano

FOREIGN PATENT DOCUMENTS

| DE | 100 02 818 | 8/2000 |
| EP | 0 961 045 | 12/1999 |
| JP | 242126/1987 | 10/1987 |
| JP | 2607993 | 2/1997 |
| JP | 89358/1998 | 4/1998 |
| JP | 247855/1999 | 9/1999 |
| JP | 351255/1999 | 12/1999 |

Primary Examiner—Lenard A. Footland
(74) Attorney, Agent, or Firm—Browdy and Neimark, P.L.L.C.

(57) ABSTRACT

A linear motion guide unit is disclosed wherein rolling elements are allowed to run smoothly through a turnaround and less subject to wear. Separators connected to elongated coupler members are allowed to travel ahead together with the rolling elements through a recirculating passage, which is composed of a load raceway, a return passage and turnarounds. The separator are each made unchanged in thickness at a limited zone over which a sliding contact point thereof with the associated rolling element changes place from S1 to S12 when the separator moves through the turnaround. The coupler member is made in the form of a flexible strip kept substantially constant in cross section throughout the overall length to bend uniformly with a fixed radius RB of curvature when moving in the turnaround. The coupler member in the turnaround travels along a curve having a radius RB of curvature, which is less than a radius RO of curvature of a locus of the center of the rolling element, but larger than a radius RS of curvature of a locus of the sliding contact point between the separator and the associated rolling element, which will change place from S1 to S12 when the separator moves through the turnaround.

11 Claims, 14 Drawing Sheets

LINEAR MOTION GUIDE UNITS WITH SEPARATOR COUPLERS

BACKGROUND OF THE INVENTION

1. Field of the Invention

The present invention relates to a linear motion guide unit including therein recirculating passages in which rolling elements are allowed to run along the recirculating passages, and separators are each arranged between any two adjoining rolling elements and joined together with each other by means of chain couplers.

2. Description of the Prior Art

Conventionally a linear motion guide unit of the type as shown in FIG. 21 is well-known in which only rolling elements such as balls, rollers and so on are installed in a recirculating passage. The prior linear motion guide unit comprises an elongated track rail 2 having raceway grooves 4 on lengthwise side surfaces thereof, and a slider 1 having raceway grooves 9 confronting the raceway grooves 4 of the track rail 1. The slider 2 fits over and conforms to the track rail 2 for sliding movement with respect to the track rail 2. The slider 2 will move along the track rail 1 by virtue of rolling elements 7 such as balls, which are allowed to run in load raceways 16 defined between the confronting raceway grooves 4 and 9. The track rail 2 has openings 13 boring through from an upper surface 14 to a bottom surface thereof at locations spaced lengthwise from each other. The track rail 2 will be fastened to the mounting base 20, such as a bed, machine base, work table or the like, by screwing bolts through the openings 13 of the track rail 2 into threaded holes in the mounting base 20.

The slider 1 has a carriage 5 movable relatively to the track rail 2, and end caps 6 secured to the opposite ends of the carriage 5, each to each end. Provided on the upper surface of the carriage 5 are openings 19 for mounting the slider 1 to other appliances, parts, chucks, grasping jaws or the like. The end caps 6 are attached on the lengthwise opposing end surfaces of the carriage 5 by means of more than one bolt 25. Both of the carriage 5 and the end caps 6 are made with recesses 10 that are opened downwards such that the carriage 5 and the end caps 6 are allowed to fit over and conform to the track rail 2 for sliding movement relatively to the track rail 2. The carriage 5 is also provided therein with return passages 12 extending in parallel with the raceway grooves 9. The end caps 6 are provided therein with claws for scooping the rolling elements 7 out of the load raceways 16 defined between the confronting raceway grooves 4 and 9, and turnaround passages, given the reference numeral 15 in FIG. 13, for recirculation of the rolling elements 7.

In the linear motion guide unit described earlier, retainer bands 18 are provided in the carriage 5 to hold the rolling elements 7, thereby preventing the rolling elements 7 from falling out of the carriage 5. Bottom seals 8 are secured to the lower surfaces of the carriage 5 and the end caps 6 to thereby close clearances between the track rail 2 and the slider 1. Also mounted on the outside end faces of the end caps 6 are end seals 17, each to each end cap, for keeping sealing function between the track rail 2 and the lengthwise opposing ends of slider 1.

The rolling elements 7 run along the load areas, that is, the load raceway 18 defined between the raceway grooves 4 of the track rail 2 and the raceway grooves 9 of the carriage 5, and then come in the turnaround passages 15 in any one of the end caps 6. The rolling elements 7 further run from the turnaround passages 15 to the return passages 12 that are formed in the carriage 5 in parallel with the load raceway grooves 9. Subsequently the rolling elements 7 return to the load areas of the raceways 16 through the turnaround passages 15 in the other one of the end caps 6. It will be thus understood that the rolling elements 7 may run in a recirculating manner though recirculating passages given the reference numeral 21 in FIG. 13, which are composed of the load raceways 16, turnaround passages and return passages 12, thereby helping ensure the smooth movement of the slider 1 relatively to the track rail 2. Installed on any one of the forward and aft end seals 17 is a grease nipple 11 through which lubricant is supplied into the carriage 5 to lubricate the raceway grooves 4 and 9 along which run the rolling elements 7.

With the conventional linear motion guide units constructed as stated earlier, any separator is interposed between any two adjoining rolling elements to keep the rolling elements against coming into rolling collision with one another, which might cause any contact force opposite in direction. Moreover, various other linear motion guide units have been devised heretofore, which are called the chain-type linear motion guide unit because of their specific construction in which the separators are joined together with each other by endless chains of couplers. Disclosed in Japanese Patent Laid-Open No. 247855/1999 is a linear motion guide unit in which the rolling elements or balls running through a recirculating passage are spaced apart from each other by separators that are each interposed between any two adjoining balls and interconnected with each other through strings in such an individually replaceable manner. Each separator is comprised of a major body made at forward and aft faces thereof with ball-contact surfaces for carrying the associated balls thereon, and webs formed integrally with the major body and extended fore-and-aft along the running direction over the spherical surfaces of the balls, and the webs being each provided therein with channels. The separators arranged in the recirculating passage with being each interposed between any two adjoining balls are interconnected with one another by using a string threading through the channels in the webs.

Further, Japanese Patent No. 2607993 discloses a linear motion guide unit having incorporated with a chain of balls, which is comprised of a series of balls running through a recirculating passage, ball retainers each interposed between any two adjoining balls, and a flexible coupler member for joining together the balls and retainers in a tandem array. The ball retainers are each made concaved at forward and aft faces thereof so as to fit snugly over the associated balls in a manner allowing the ball retainer to move relatively to the associated balls. Thus, a series of balls may be made in an endless form by bending the flexible coupler member in a loop. With the ball chain recited earlier, however, there is some tendency in which the concaved surfaces of the ball retainer, when running through the turnaround, are drawn radially inwardly of a curvature of locus of rolling-contact point between the ball retainer and the associated ball, thus causing much deformation in the ball retainer at the area between the concaved surfaces that are opposite sides of the ball retainer. As a result, there is a possibility that the flexible coupler member might be much subject to deformation at the area between the concaved surfaces because the flexible coupler member is less in thickness at the area between the concaved surfaces.

Disclosed in Japanese Patent Laid-Open No. 89358/1998 is another linear motion guide unit, in which the balls fit in the flexible coupler member with being positioned at regular intervals in tandem along their moving direction. In need of repair or replacement of the ball, any ball may be removed from the coupler member by only pressing out the ball towards any raceway groove of the load raceway where the balls run through there.

Another Japanese Patent Laid-Open No. 351255/1999 discloses a coupler arrangement for a series of rolling elements, which is comprised of a carrier strip of flexible element made therein with a series of openings to accommodate therein rolling elements, and holder elements to keep in position the rolling elements fit in the openings. The carrier strip is composed of sidewise opposing lengthwise edges and traverse sections extending crosswise between the lengthwise edges while the holder elements are attached to the flexible element at the lengthwise edges of the carrier strip. Moreover, a chain-type linear motion rolling bearing arrangement proposed initially is disclosed in Japanese Patent Laid-Open No. 242126/1987, wherein the separators are each interposed between any two adjoining rolling elements to keep the rolling elements against coming into rolling collision with one another during running through the recirculating passage, especially the load raceway, which might cause any contact force opposite in direction. In addition, the coupler means or the chains are provided to join together the separators with each other, thus helping protect the rolling elements from wear owing to the metal-to-metal collision thereof, with the result of improving smooth recirculation property of the rolling elements. With the slider in the linear motion guide unit having therein at least two curvilinear passages or turnarounds where the rolling elements running through the recirculating passage will turn over in moving direction, nevertheless, how smoothly the rolling elements can travel through the turnarounds would be important to the chain-type linear motion guide units. Thus, it remains a major challenge to ensure the smooth run of the rolling elements, each of which is held between the adjacent separators joined together by the coupler chains, at the turnarounds in the end caps.

SUMMARY OF THE INVENTION

The present invention is directed to overcoming one or more of the problems as set forth above, and more particular, allowing a combination of rolling elements, separators each interposed between any two adjoining rolling elements and a coupler member joining together the separators with one another to run smoothly through a recirculating passage comprised of linear passages and curvilinear passages, both of which are provided in a slider. To cope with this, according to the present invention, a linear motion guide unit with a separator coupler is provided, in which the separators are each made unchanged in thickness at a limited zone so as to allow a sliding contact point thereof with the associated rolling element to easily swerve radially inwardly of the curvilinear passage when the separator moves through the turnaround, and moreover the coupler member is made in the form of a flexible strip kept substantially constant in cross section throughout the overall length to be bend uniformly with a fixed radius of curvature when moving in the turnaround, the fixed radius of curvature being defined within a desired range.

The present invention is concerned with a linear motion guide unit with a separator coupler, comprising a track rail, a slider movable with respect to the track rail and including therein a recirculating passage composed of a linear passage and a curvilinear passage connected to each other, the recirculating passage having incorporated with rolling elements, separators each interposed between any two adjoining rolling elements, and a coupler member connecting the separators to one another, the separator being made even in thickness at a zone over which a sliding contact point thereof with the associated rolling element changes place when the separator moves through the curvilinear passage, the coupler member being made in the form of a strip kept substantially constant in cross section throughout the overall length to bend uniformly with a fixed radius of curvature when moving in the curvilinear passage, and wherein the coupler member in the curvilinear passage travels along a desired curve having a radius of curvature, which is less than a radius of curvature of a locus of center of the rolling element, but larger than a radius of curvature of a locus of the sliding contact point of the separator with the associated rolling element, which will change place when the separator moves through the curvilinear passage.

The slider has a carriage and end caps attached to forward and aft ends of the carriage, each to each end. The linear passage includes a load raceway defined between a raceway groove formed in the carriage and a raceway groove formed on the track rail, and a return passage made in the carriage in parallel with the load raceway, while the curvilinear passage is composed of turnarounds formed in the end caps, each to each cap. The recirculating passage has incorporated with not only the rolling elements running through there, but also separators connected together to the coupler member to space any two adjoining rolling elements apart away from each other thereby keeping them against direct contact with each other.

The separators are joined together with the coupler member into the form of a kind of chain.

According to one aspect of the present invention, a linear motion guide unit with a separator coupler is disclosed in which the slider includes therein a carriage and end caps attached to forward and aft ends of the carriage, each to each end, the linear passage is composed of a load raceway defined between a raceway groove formed in the carriage and a raceway groove formed on the track rail, and a return passage made in the carriage in parallel with the load raceway, while the curvilinear passage is composed of turnarounds formed in the end caps, each to each cap.

According to another aspect of the present invention, a linear motion guide unit with a separator coupler is disclosed in which the separator coupler is composed of a pair of coupler members arranged to flank on radially opposite sides of any rolling element, each to each side, and joined together with the separators.

According to another aspect of the present invention, a linear motion guide unit with a separator coupler is disclosed in which the rolling element is a ball, and the coupler members arranged to flank on radially opposite sides of any rolling element define, in combination with any two adjacent separators, substantially round windows to accommodate therein the balls, each in each window. As an alternative, the rolling element is any one of a ball and a roller, and the coupler members arranged to flank on radially opposite sides of any rolling element define, in combination with any two adjacent separators, substantially rectangular windows to accommodate therein the rolling elements, each in each window.

According to a further another aspect of the present invention, a linear motion guide unit with a separator coupler is disclosed in which the separators extend radially inwardly of the curvilinear passage, with ranging from a place lying on the desired curve for the coupler member to an innermost end thereof coming into sliding engagement with a radially inside surface of the curvilinear passage, thereby helping ensure that the coupler member travels along the desired curve throughout the curvilinear passage.

According to another aspect of the present invention, a linear motion guide unit with a separator coupler is disclosed in which the separators each have inside and outside parts that extend in radially opposite direction of the curvilinear passage in symmetry with respect to a lengthwise centerline of the coupler member.

According to another aspect of the present invention, a linear motion guide unit with a separator coupler is disclosed in which the separators each made even in thickness in cross section throughout an overall width spanning between a radially inside surface and a radially outside surface in the recirculating passage. As an alternative, the separators each are made thickened in cross section only at an innermost end thereof near the radially inside surface in the recirculating passage, compared with other residual area of the separator. Moreover, the separators each may be made thickened in cross section not only at an innermost end thereof near the radially inside surface in the recirculating passage, but also at an outermost end thereof near the radially outside surface in the recirculating passage in such a configuration fitting over and conforming to the associated rolling element, with leaving a zone over which a sliding contact point thereof with the associated rolling element changes place when the separator moves through the curvilinear passage.

A further another aspect of the present invention, a linear motion guide unit with a separator coupler is disclosed in which there is provided a retainer band to keep in place not only the rolling elements but also a coupler chain of the coupler member connected with the separators against falling out of the slider even after the slider has been disassembled from the track rail.

With the linear motion guide unit constructed as stated earlier, the rolling elements are spaced apart away from each other with the separators that are each interposed between any two adjoining rolling elements and also joined together by means of the coupler member. Nevertheless, the coupler member may be less subject to deformation even the construction that the rolling elements turn about with a small radius of curvature or the turnaround is made small in the radius of curvature. Thus, the rolling elements are allowed to run smoothly through the curvilinear passage in the recirculating passage or the turnaround formed in the end cap, with being less subject to resistance due to the coupler member. As any rolling element comes into only point contact with the associated separator, both the rolling element and the separator may be less subject to wear, consequently improved in running performance in the recirculating motion. Moreover, since the sliding contact point of the separator with the associated rolling element may easily change place when the rolling element goes ahead through the turnaround, the rolling elements are allowed to run smoothly through the recirculating passage, especially the curvilinear passage in the turnaround without undergoing the resistance owing to the coupler member.

According to the linear motion guide unit constructed as described above, the coupler member experiences less deformation even the turnaround is small in radius of curvature. Thus, the rolling elements are allowed to run smoothly through the curvilinear passage in the recirculating passage or the turnaround formed in the end cap, with being less subject to resistance due to the coupler member. In particular, the rolling elements, as less subject to wear, are allowed continuing to keep high running performance.

Thickening the separator at either any one or both of its innermost end near the radially inside surface in the recirculating passage and its outermost end near the radially outside surface in the recirculating passage, moreover, helps reduce wear of the separator and also keep in place the associated rolling element.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 1:
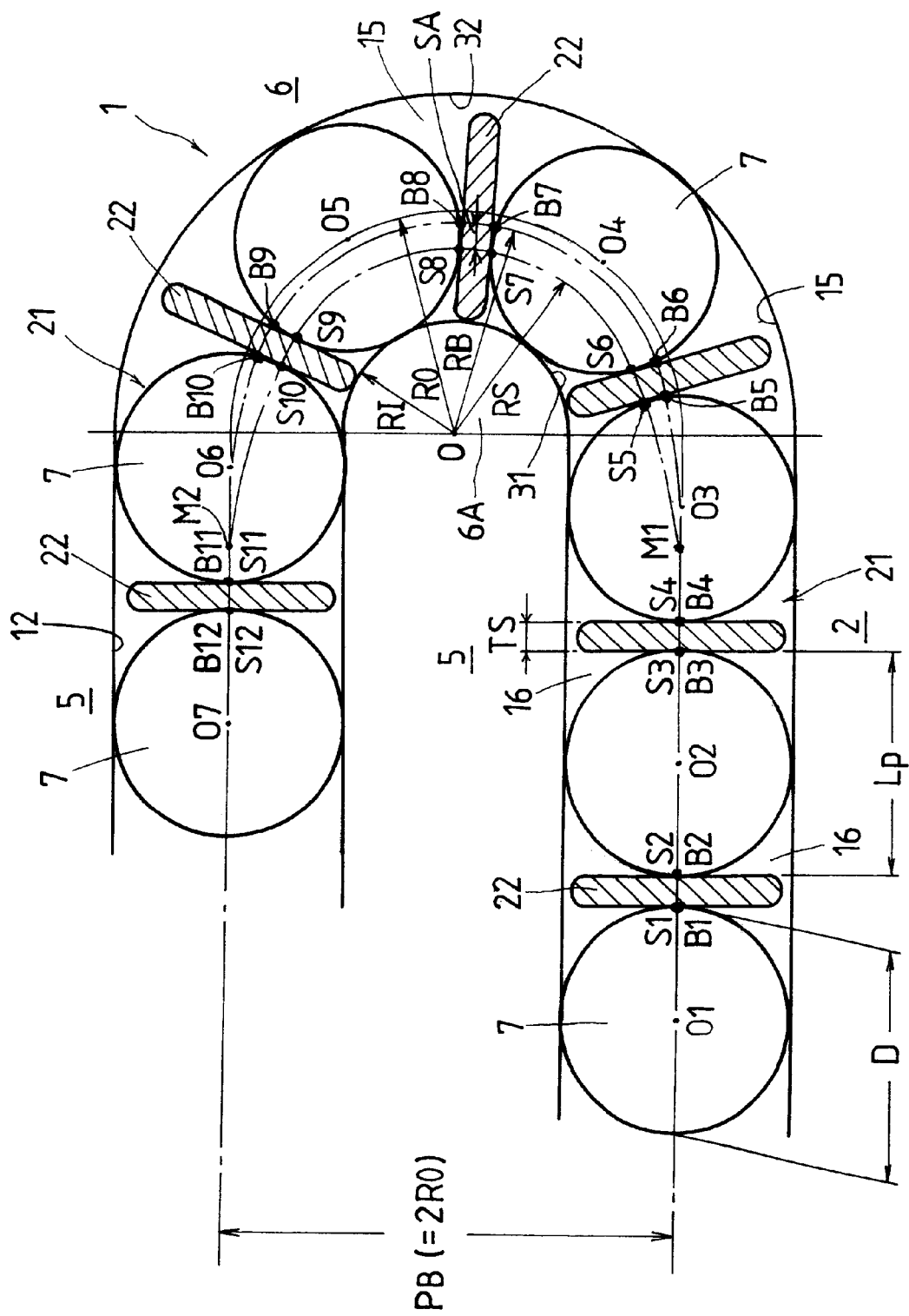
FIG. 1 is a fragmentary schematic illustration explaining a fundamental concept in construction of a linear motion guide unit having incorporated with a preferred embodiment of a separator coupler according to the present invention, the view being taken on the plane of the line V—V of FIG. 2 to show particularly a turnaround in a recirculating passage.

Some preferred embodiments of a linear motion guide unit having incorporated with a separator coupler according to the present invention will be hereinafter explained in detail with reference to FIGS. 1 to 20. Components and parts in each of FIGS. 1 to 20 identical or equivalent in function with that explained earlier in FIG. 21 are identified by the same reference numerals as in FIG. 21.

First referring to FIG. 1, a linear motion guide unit having incorporated therein with a separator coupler according to the present invention will be explained hereinafter.

The linear motion guide unit is comprised of the track rail 2 and the slider 1 fitting over the track rail 2 for linear movement with respect to the track rail 2. The slider is made therein with a recirculating passage 21 including linear or straight passages and curvilinear passages communicated with the linear passages. The whole configuration of the recirculating passage 21 will be explained later with reference to FIG. 13. The slider 1 is composed of the carriage 5 and the end caps 6 fastened to forward and aft ends of the carriage 5, each to each end. The linear passages include a load raceway 16 defined between the confronting raceway grooves 4, 9 formed on the carriage 5 and the track rail 2, respectively, and a return passage 12 extending in the carriage 5 in parallel with the load raceway 16, while the curvilinear passages are made in the form of turnarounds 15 in the end caps 6, each to each end cap. Installed in the recirculating passage are rolling elements 7, separators 22 each interposed between ant two adjoining rolling elements 7, and a pair of coupler members 23, 28 to which the separators 22 are joined at their radially opposite sides. The separators 22 are each arranged between any two adjoining rolling elements 7 so as to space apart away them from each other to keep them against coming into direct contact with one another. The coupler members 23, 28 are connected with the separators 22 to form a coupler chain 26, 30.

The linear motion guide unit of the present invention features the separator 22 made unchanged in thickness at a limited area covering at least a zone over which a sliding contact point thereof with the associated rolling element 7 changes place from S1 to S12 when the separator 22 moves through the curvilinear turnaround 15. Moreover, the linear motion guide unit of the present invention features the coupler member 23 (28) made in the form of a flexible strip kept substantially constant in cross section throughout the overall length to bend uniformly with a fixed radius RB of curvature when moving in the curvilinear turnaround 15. The linear motion guide unit of the present invention also features that the coupler member 23 (28) in the curvilinear turnaround 15 travels along a curve having a radius RB of curvature, which is less than a radius RO of curvature of a locus of the center of the rolling element 7, but larger than a radius RS of curvature of a locus of the sliding contact point between the separator 22 and the associated rolling element 7, which will change place from S1 to S12 when the separator 22 moves through the curvilinear turnaround 15. In the recirculating passage 21, a separator pitch Lp between successive separators 22 arranged along the coupler members 23, 28 is made to a distance somewhat longer than a diameter D of the rolling element 7. Thus, the coupler members 23, 28 may lead successfully the rolling elements 7, with allowing the rolling elements 7 to run freely through the load raceway 16. According to another aspect, the coupler members 23, 28, as being made flexible, may travel smoothly through the recirculating passage with entrained on the rolling elements 7 running through the load raceway 16. The coupler members 23, 28 may be made of synthetic resin and formed integral with the separators 22.

As the coupler members 23, 28 will experience any repeated bending-and-straightening action, which will be referred hereinafter as deformation, during their travels from the load raceway 16 to the turnaround 15, and from the turnaround 15 to the return passage 12 and vice versa, they would reach their service age or limited duration owing to deterioration caused by the fatigue occurring under the action of repeated stresses. The greater the deformation that is applied to the coupler members, the earlier they will run out of the limited service duration. To deal with a major issue of prolonging the service duration, it will be thus recommended that the coupler members 23, 28 may experience less deformation. To cope with this, the greater the radius RO of curvature that is described with a locus of the center of the rolling element 7 running in the turnaround 15, the less will become the deformation that might occur in the coupler members 23, 28 in the turnaround 15.

Nevertheless, as the recent advanced linear motion guide units are needed to be made slim or compact in size, the radius of curvature in the turnaround 15 has to be inevitably made as small as possible to render the linear motion guide unit slim in construction. The linear motion guide unit having incorporated with a separator coupler according to the present invention is directed to overcome the major problem stated just earlier. With the separator coupler of the present invention, there is provided an unique coupler member 23 (28) in which the deformation taking place in the turnaround 15 may be kept reduced with no concern about how small the radius RO of curvature described with a locus of the center of the rolling element, or the radius of curvature in the turnaround 15 is made, whereby the coupler chain 26 (30) of the coupler member 23 (28) with a series of the separators 22 is allowed to move with smooth through the turnaround 15.

As seen from FIG. 1, a locus S1~S4 of rolling contact point of any rolling element 7 with the associated separator 22 is kept conformed to a locus 01~03 of the center of the rolling element 7 in the load raceway 16. Now assuming that a locus B1~B4 of a midpoint sidewise spanning between the coupler members 23, 28 lies in alignment with the locus 01~03 of the center of the rolling element 7, while a distance PB between lengthwise axes of the load raceway 16 and the associated return passage 12 is set PB=2RO, and also the turnaround 15 describes a semicircular arc having a radius RO of curvature. While any rolling element 7, after having left the load raceway 16, runs through the turnaround 15, a locus 04, 05 of the center of the rolling element 7 continues lying on a curve having the radius RO of curvature, whereas a locus M1, S5~S10, M2 of rolling contact point of the rolling element 7 with the associated separator 22 swerves radially inwardly to move along a curve having the radius RS of curvature. In the meantime the coupler member 23 (28) needs to be constructed in a way stated later to make sure of uniform bending conforming to the curvature of the turnaround 15, and in doing so succeed in reducing the deformation to a minimum.

In FIG. 1 where the coupler member 23 (28) comes to bend uniformly throughout the turnaround 15, now assuming that a straight distance between any two lengthwise opposing midpoints, for example B2 and B3 spanning sidewise between the coupler members 23, 28 in the load raceway 16, that is to say, the separator pitch Lp between successive separators 22 opposing across the rolling element 7 in the load raceway 16 would remain unchanged even when getting curved in the turnaround 15, a locus B4~B11 of the midpoints in the turnaround 15 will lie substantially on the curve having the radius RB of curvature. Thus, the coupler member 23 (28) in the curvilinear turnaround 15 will travel along a curve having the radius RB of curvature, which is less than the radius RO of curvature of a locus 01~07 of the center of the rolling element 7, but larger than the radius RS of curvature of a locus S1~S12 of the sliding contact point of the separator 22 with the associated rolling element 7. As will be understood from the above, allowing the sliding contact point of the separator 22 with the associated rolling element 7 to easily change the place towards a radially inside curvilinear surface 31 in the turnaround 15 as depicted at from S1 to S12 plays a critical role in leading the coupler members 23, 28 substantially along the curve having the radius RB of curvature, thereby helping ensure the smooth travel of all components of the rolling elements 7, separators 22 and coupler members 23, 28 through the turnaround 15.

Figure 14:
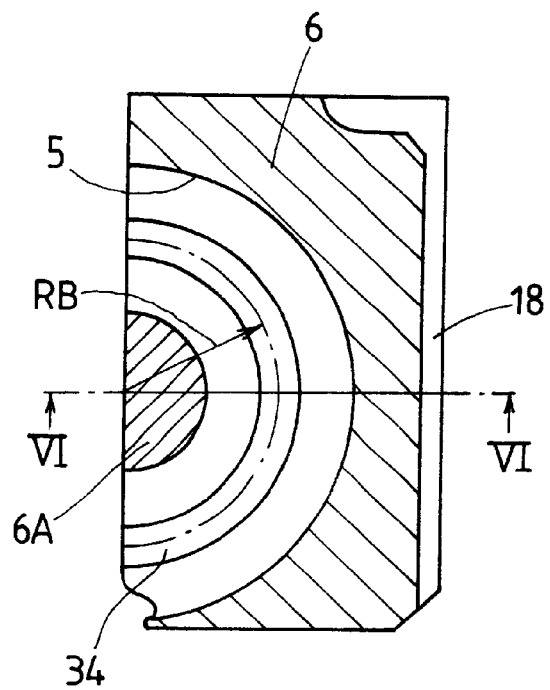
FIG. 14 is a fragmentary sectional view showing an end cap in FIG. 13.
Figure 15:
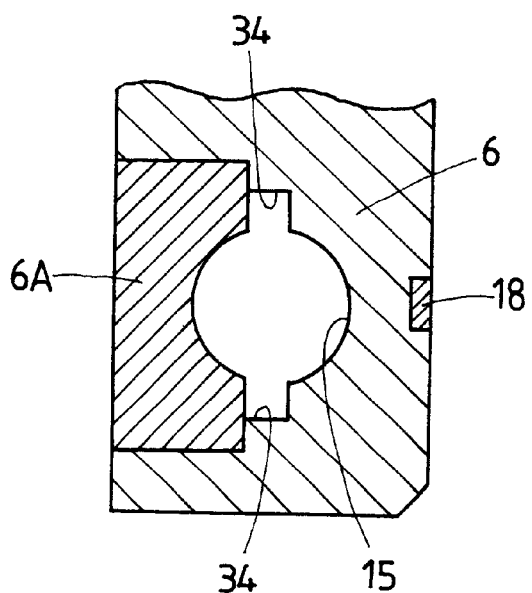
FIG. 15 is a section taken on the plane of the line VI—VI of FIG. 14.
Figure 16:
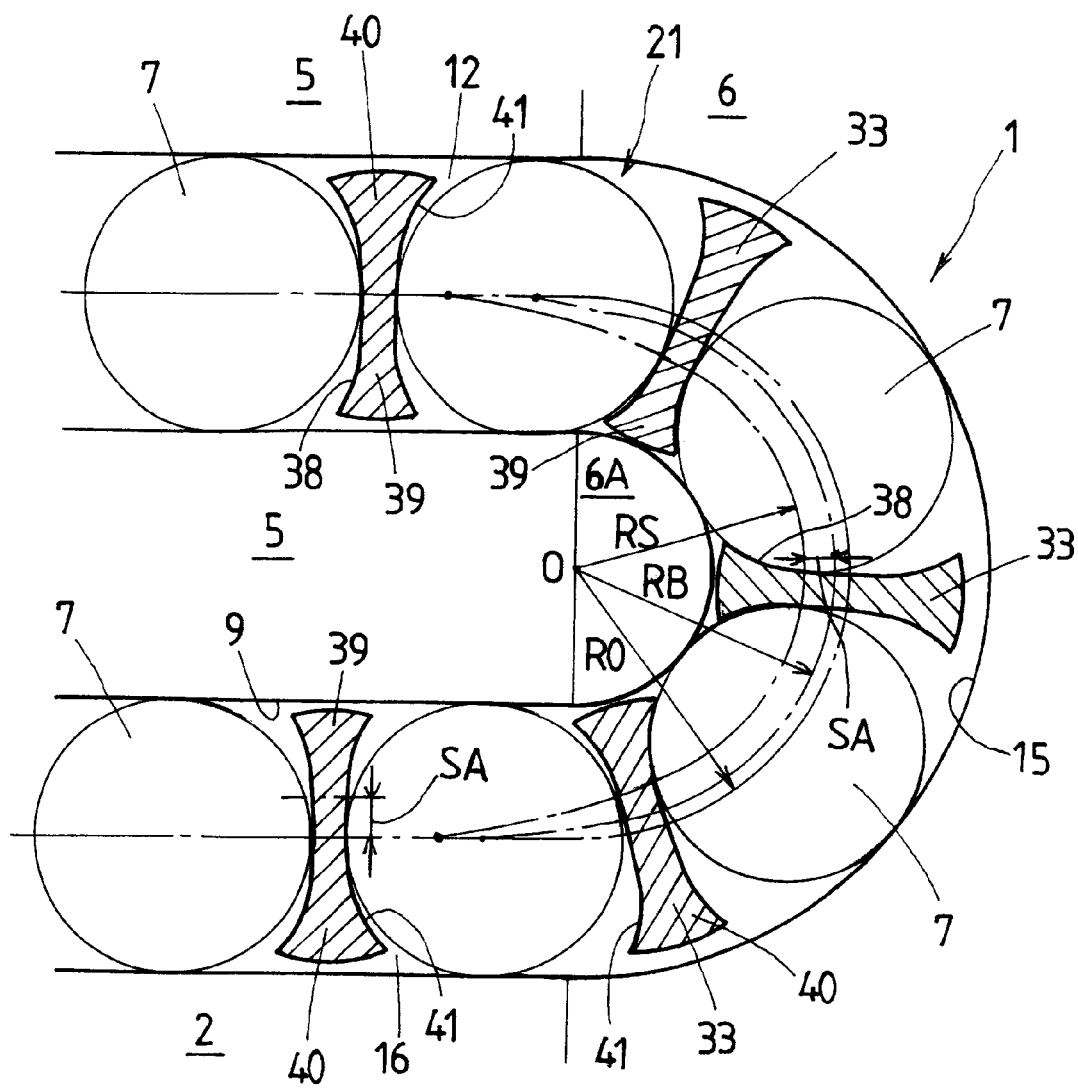
FIG. 16 is a fragmentary schematic illustration explaining a fundamental concept in construction of a linear motion guide unit having incorporated with a further another embodiment of a separator coupler according to the present invention, the view being taken on the plane of the line V—V of FIG. 2 to show particularly a turnaround in a recirculating passage.
Figure 17:
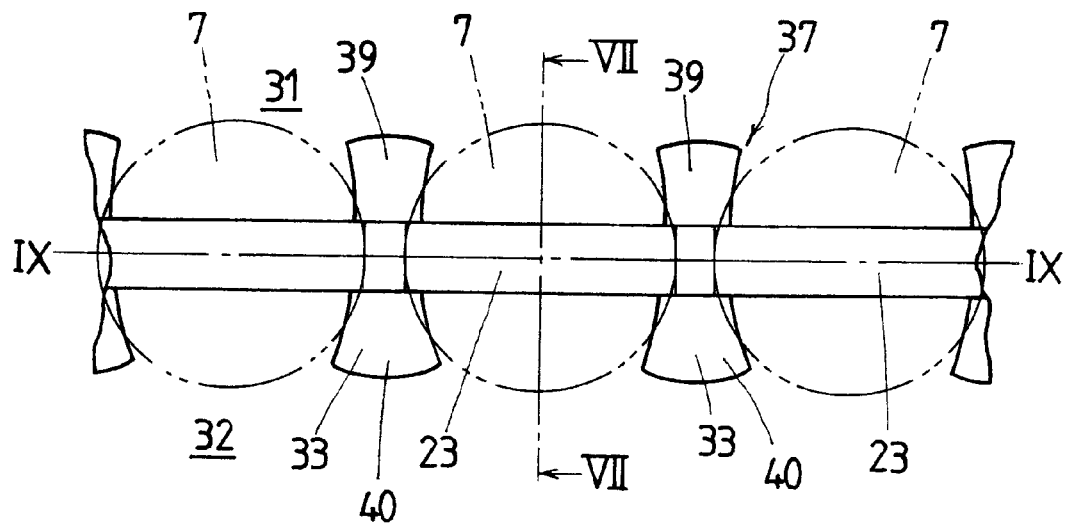
FIG. 17 is a fragmentary top plan view depicting a further another embodiment of a coupler member with separators.
Figure 18:
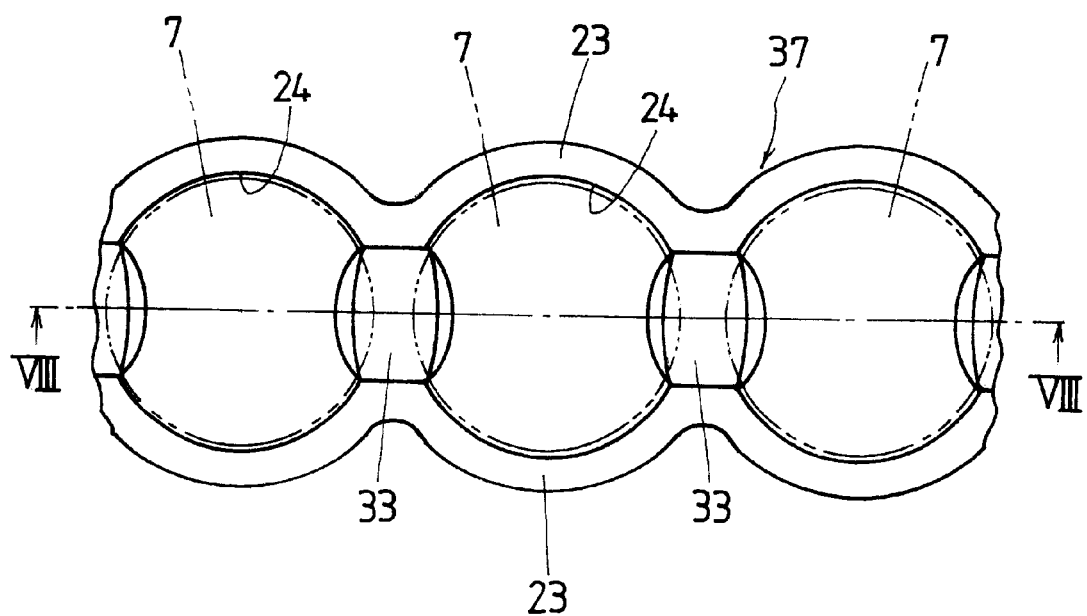
FIG. 18 is a front elevation showing the coupler member with separators of FIG. 17.
Figure 19:
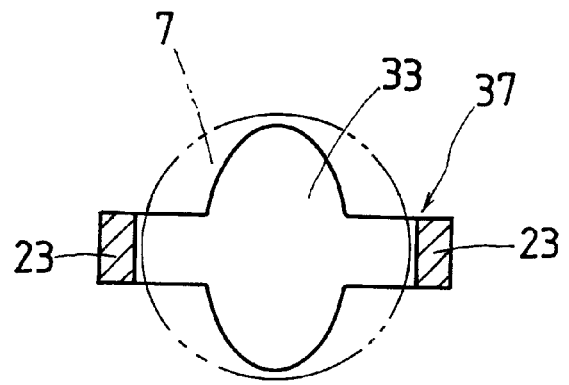
FIG. 19 is a cross-sectional view taken on the plane of the line VII—VII of FIG. 17.

With the linear motion guide unit according to the present invention, to this end, the separator 22 is made unchanged in thickness in cross section at a limited area covering at least a radial zone SA over which a sliding contact point thereof with the associated rolling element 7 changes place towards the radially inside curvilinear surface 31 in the turnaround 15 as depicted at from S1 to S12. The separator 22 shown in FIG. 1 is made even in thickness in cross section throughout the overall area thereof. To make sure of leading the coupler member 23 (28) substantially along the curve having the radius RB of curvature in the turnaround 15, the separators 22 extend radially inwardly of the curvilinear passage into sliding engagement at their innermost ends with a radially inside surface of the curvilinear passage. The sliding engagement with the radially inside surface of the curvilinear passage helps ensure that the coupler member 23 (28) travels along the desired curve having the radius RB of curvature throughout the curvilinear passage. As an alternative to hold the coupler member 23 (28) to go ahead substantially along the curve having the radius RB of curvature, the end cap 6, 6A is, as shown in FIGS. 14 and 15, made with a guide channel 34 open to the turnaround 15 to lead the coupler member 23 along the curve having the radius RB of curvature. It is also allowed to form the channel 34 in the cap 6, 6A in addition to the sliding engagement of the separator 22 with the radially inside surface of the curvilinear passage.

Referring to FIGS. 3 to 7, there are shown embodiments of the coupler chain according to the present invention incorporated in the linear motion guide unit.

The coupler chain 26 in FIGS. 3 to 6 is mainly composed of separators 22 each imposed between any two adjoining rolling elements 7 or balls, and a coupler member 23 joining together the separators 22 with each other. The coupler chain 26, although may be made in an endless form conforming in the overall length to the recirculating passage 21, is once cut at, for example a plane represented by reference character X—X to be straightened in a linear form that allows its insertion into the return passage 12 and the turnaround 15. The coupler chain 26 threaded through the return passage 12 and the turnaround 15 is joined together at the opposing cut ends thereof to make again the endless form conforming to the overall length to the recirculating passage 21. The coupler chain 26 unnecessarily needs to be made endless. As an alternative, there may be provided a linear coupler construction having the separators 22 at its lengthwise opposing ends, which are followed by only coming into abutment with each other at any place in the recirculating passage 21.

Figure 2:
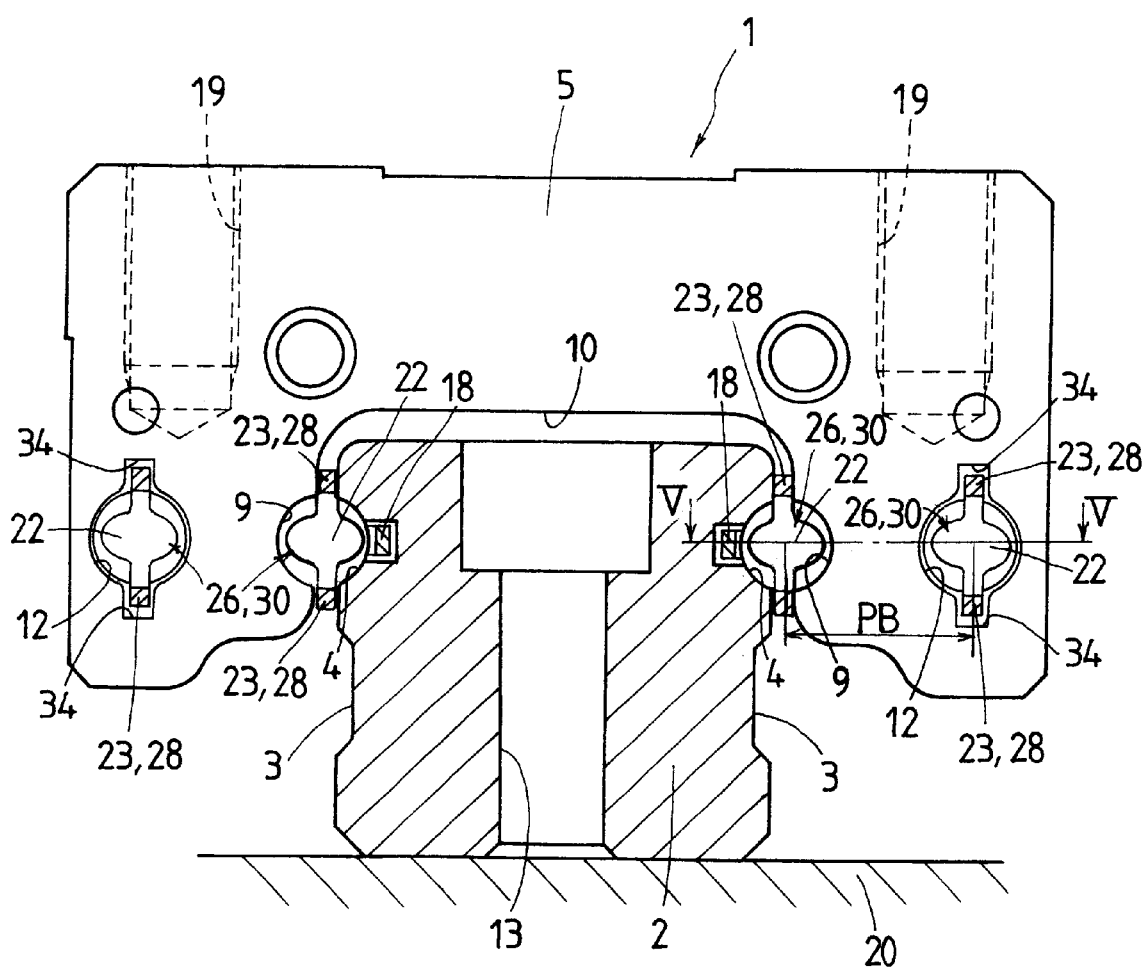
FIG. 2 is a front elevation, partly in cross section, of a linear motion guide unit having incorporated with a coupler chain of the present invention, an end cap being removed.
Figure 3:
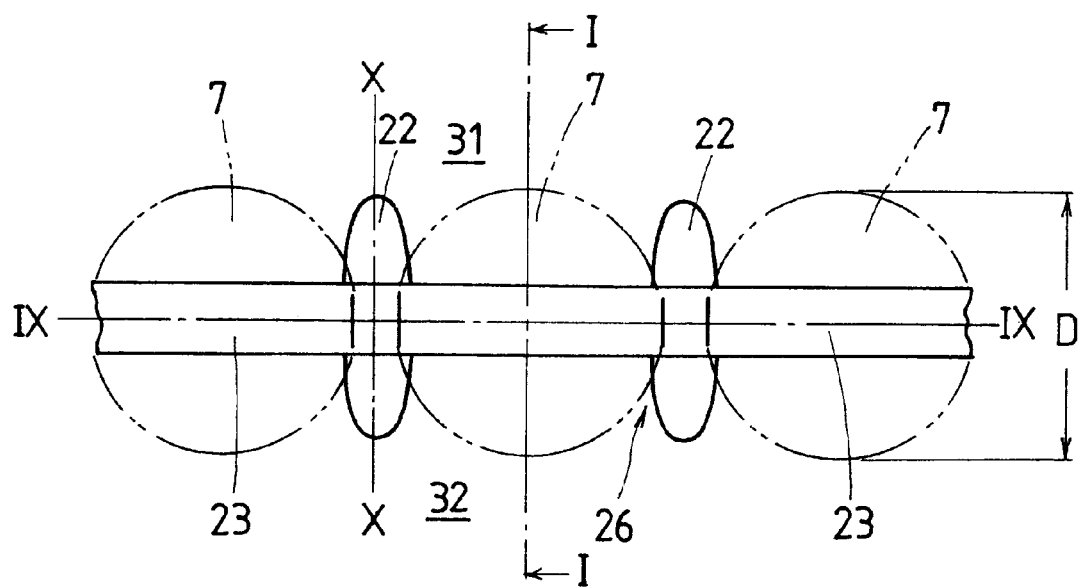
FIG. 3 is a fragmentary top plan view of a coupler member with separators.
Figure 4:
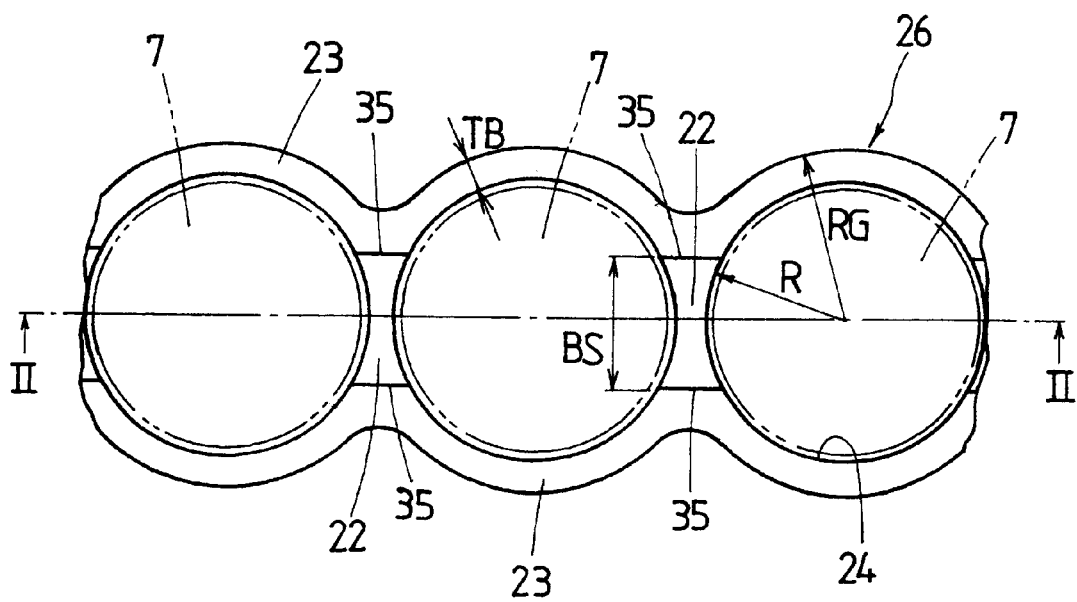
FIG. 4 is a front elevation showing the coupler member with separators of FIG. 3.
Figure 5:
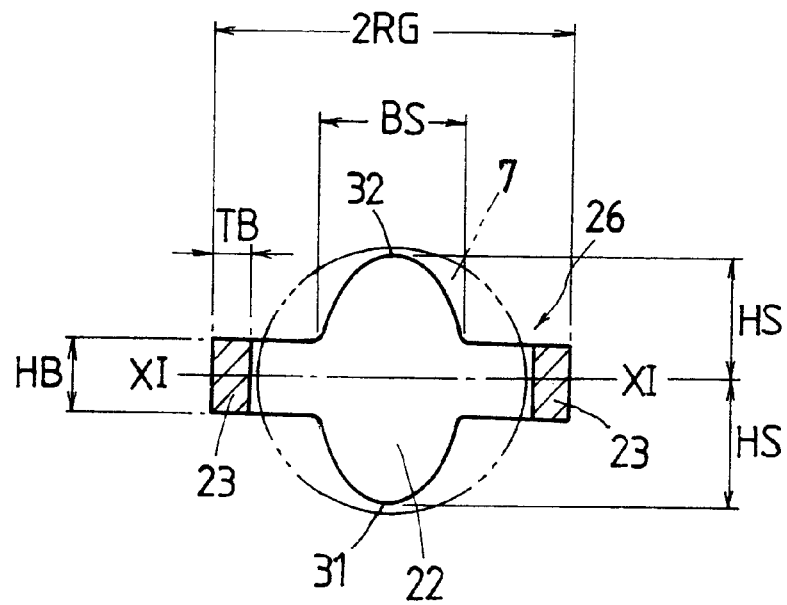
FIG. 5 is a cross-sectional view taken on the plane of the line I—I of FIG. 3.
Figure 6:
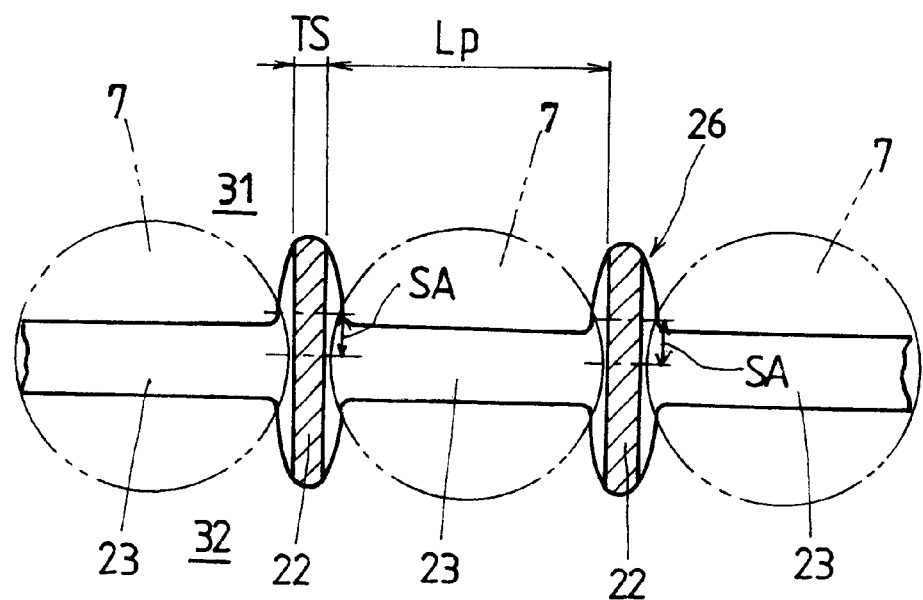
FIG. 6 is a cross-sectional view taken on the plane of the line II—II of FIG. 4.

In FIG. 3, the top side above a horizontal line IX—IX along the coupler member 23 corresponds to the inside 31 of the recirculating passage 21 while the bottom side below the line IX—IX is the outside 32 of the recirculating passage 21. That is, the top side shows an area inside a circular course of the recirculating passage 21 when seen on a plane taken along a line V—V in FIG. 2, while the bottom side corresponds to another area outside the circularly recirculating passage 21. The coupler chain 26 in FIG. 3 is shown as being extended straight lengthwise. The coupler member 23 (28) is made in an elongated form or a strip that extends along the line IX—IX lying on the centers of a successive rolling elements 7 and has a cross-sectional area (TB×HB) as shown in FIG. 5. The coupler member 23 (28) is also formed to have an inside periphery of a minor radius R conforming to an outside spherical surface of the rolling member 7, and an outside periphery of a major radius RG. The coupler member 23 (28) is joined at 35 integrally with the successive separators 22. The coupler chain 26 as shown in FIG. 4 has therein a series of round windows 24, each of which is made somewhat lager in radius R than any rolling element 7 to be held in the associated window 24, with being flanked by either any one or both of the coupler members 23, 28. Meanwhile, as the coupler members 23, 28 are made in strip uniform in cross section, they are allowed to bend with the curvature uniform throughout the turnaround 15.

As understood from FIG. 1, any separator 22 needs to permit the sliding contact point S1~S12 with the associated rolling elements 7 changing place as the separator 22 travels through the turnaround 15. To this end, the separator 22 is made to keep constant a distance between the sliding contact points S1, S2 on forward and aft surfaces thereof with the adjoining rolling elements 7, so that the sliding contact points S1~S4, S11 and S12 in at least the zone where the coupler chain 26 extends straight travel ahead along a locus described by the centers of the rolling elements 7, while the sliding contact points S5~S10 in the turnaround 15 where the coupler chain 26 goes curved ahead are allowed to swerve from a locus described by the centers of the rolling elements 7. That is to say, the separator 22 is made unchanged in thickness TS in cross section between the adjoining rolling elements 7 at a limited area covering at least a radial zone on the separator 22 spanning between a central contact point represented by from S1 to S4 in the load raceway 16 and from S11 to S12 in the return passage 12 and an inward off-center contact point represented by from S5 to S10 in the turnaround 15. Here, the separator 22 is shown as having the thickness TS in cross section, which is kept constant over a zone SA on which the sliding contact point with the associated rolling element 7 might change place between the radial outside 32 and the radial inside 31 in the turnaround 15.

Moreover, the separator 22, as shown in FIG. 1, is made in diametral size such that it is allowed to move ahead through the turnaround 15, with keeping a sliding contact at radially innermost end thereof with the radially inside surface 31 of the turnaround 15, thereby leading the coupler member 23 (28) substantially along the curve having the radius RB of curvature in the curvilinear turnaround 15. The diametral size of the separator 22, as shown in detail in FIG. 5, is determined such that a length HS measured from the center XI—XI to the radially innermost end thereof becomes a size given by subtracting the radius RI of curvature on the radially inside surface of the turnaround 15 from the radius RB of curvature on the coupler member 23 (28) moving ahead through the turnaround 15 as shown in FIG. 1: (HS=RB-RI). Here, as in FIG. 5, the outermost end of the separator 22 is spaced apart by the same distance HS from the center XI—XI in symmetry with the innermost end. Thus, the separator 22 may be used in a way turned inside out. Besides, the separator 22 is made rounded along the periphery including the innermost end thereof to keep the separator 22 against any interference with the rolling elements 7 and the recirculating passage 21.

As shown in FIG. 5, moreover, the separator 22 is made to have a zone coming into rolling contact with any rolling element 7, or a zone of a width BS, which is about a half a diameter D of the rolling element 7. Referring to FIG. 4 showing the separator 22 in plan view, the opposite surfaces of the separator 22 coming into contact with the associated rolling elements 7 are made concave in snug conformity with the sphericity of the rolling element 7. That is to say, the opposite surfaces of the separator 22 coming into contact with the associated rolling elements 7 are each made in a cylindrical concave arc having the radius R of curvature. The width BS where the separator 22 comes into rolling contact with the associated rolling element 7 may be determined properly in light of stiffness enough to keep the coupler member in place. As an alternative, the separator 22 may be made in a form extending throughout the overall width 2RG in FIG. 5, rather than the width BS stated earlier.

Figure 7:
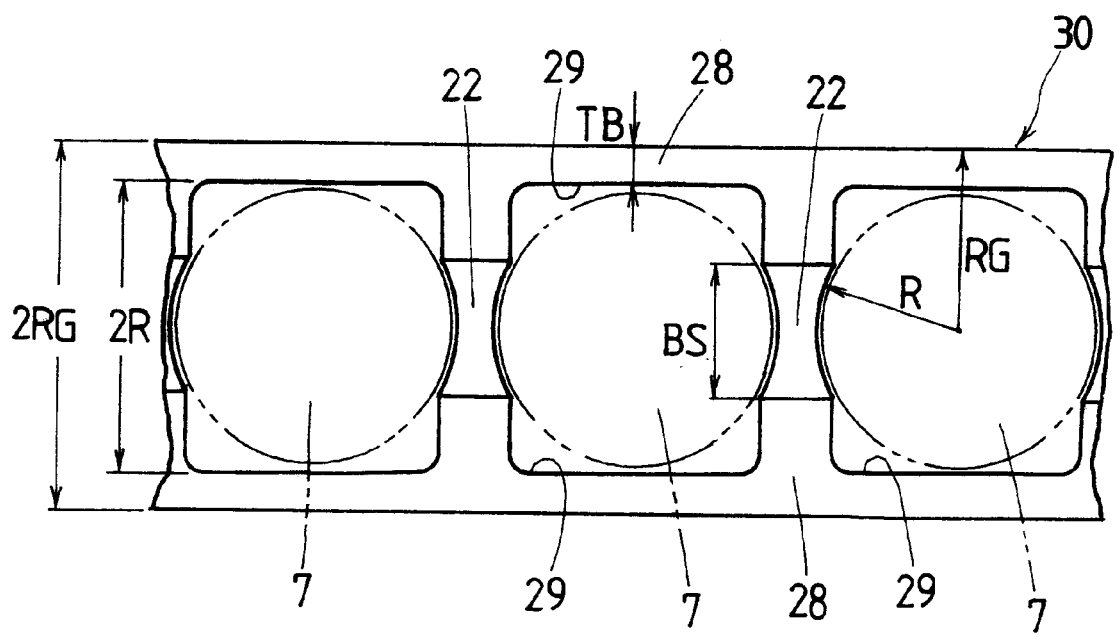
FIG. 7 is a view similar to FIG. 4 depicting another embodiment of the coupler member with separators.

Referring next to FIG. 7, there is shown another embodiment of the coupler chain to be incorporated in the linear motion guide unit. The coupler chain 30 is provided therein with a series of windows 29 made in a substantially rectangular shape viewed in the front elevation, in which the rolling elements 7 are contained, each to each window. The overall width of the coupler chain 30 is 2RG while the width of the window 29 is 2R. Besides, the coupler member 28 has a widthwise thickness of TB and a rolling contact area of the separator 22 with the associated rolling element 7 has a width of BS. The coupler chain 30, although being shown in only a front elevation in FIG. 7, is substantially identical with the first separator 26 in other figures corresponding to FIGS. 3, 5 and 6 and, therefore, these previous figures are applicable.

The coupler chain 26 (30) will be, as shown in FIGS. 1 and 2, incorporated together with the rolling elements 7 in the recirculating passage 21 in the linear motion guide unit. Here, it should be noted that the return passage 12 is made somewhat larger in cross section to the extent that the coupler chain 26 (30) containing therein the rolling elements 7 is allowed to travel through there without wobbling. It is to be also noted that the retainer bands 18 are provided in the slider 1 to keep the rolling elements 7 against falling out of the slider 1 and help the coupler chain 26 (30) move properly after the slider 1 has been disassembled from the track rail 2.

Another embodiment of coupler chain used in the linear motion guide unit will be explained hereinafter with reference to FIGS. 8 to 15.

Figure 8:
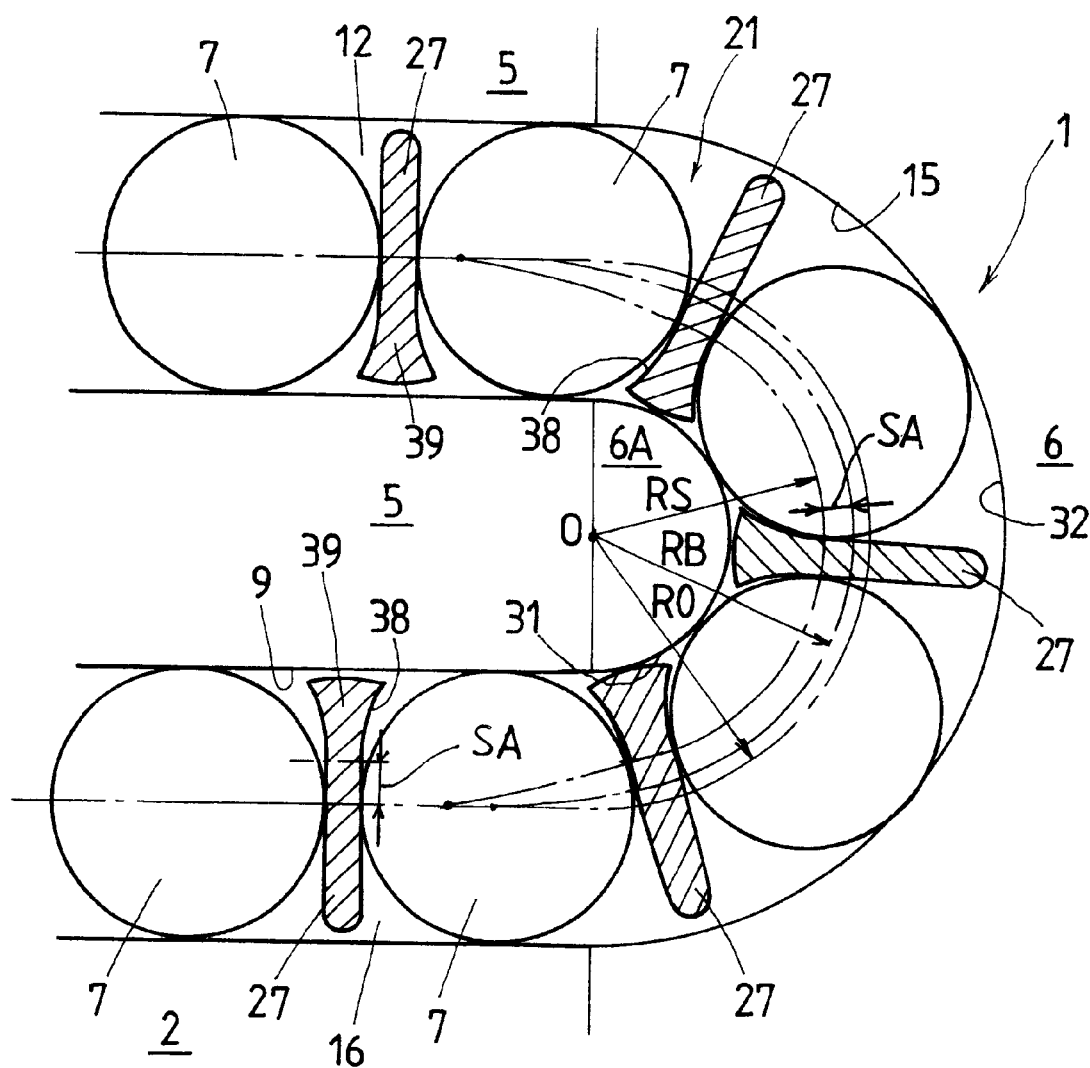
FIG. 8 is a fragmentary schematic illustration explaining a fundamental concept in construction of a linear motion guide unit having incorporated with another embodiment of a separator coupler according to the present invention, the view being taken on the plane of the line V—V of FIG. 2 to show particularly a turnaround in a recirculating passage.
Figure 9:
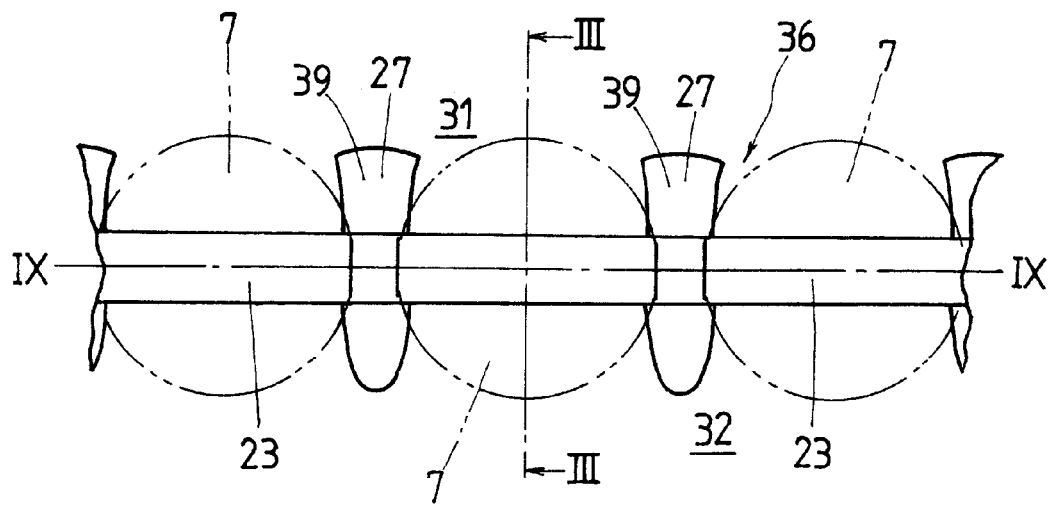
FIG. 9 is a fragmentary top plan view of another embodiment of a coupler member with separators.
Figure 10:
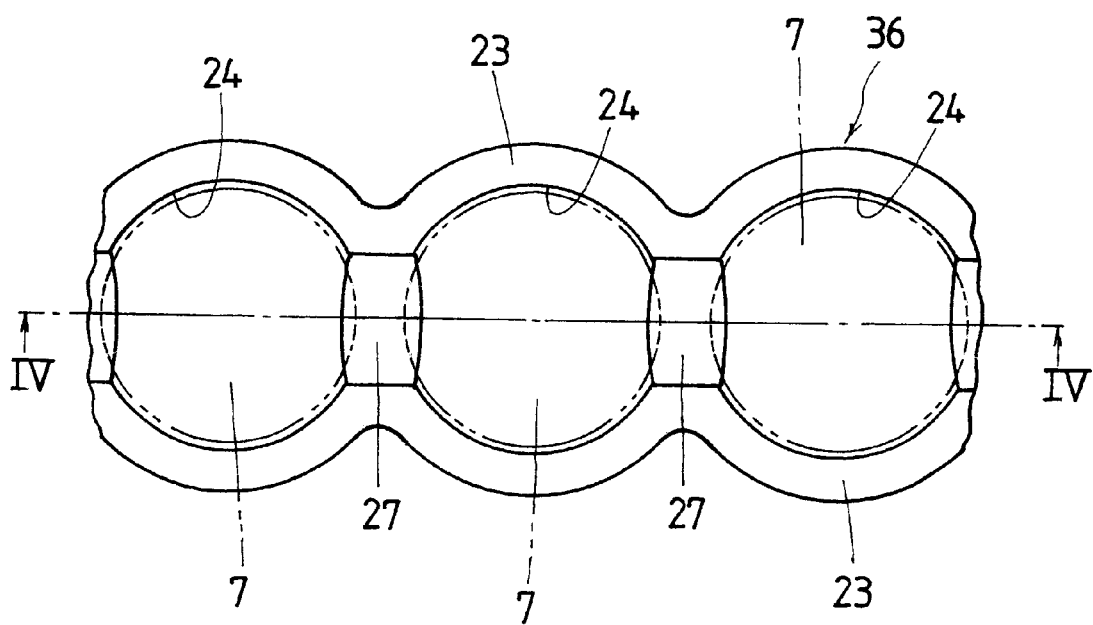
FIG. 10 is a front elevation showing the coupler member with separators of FIG. 9.
Figure 11:
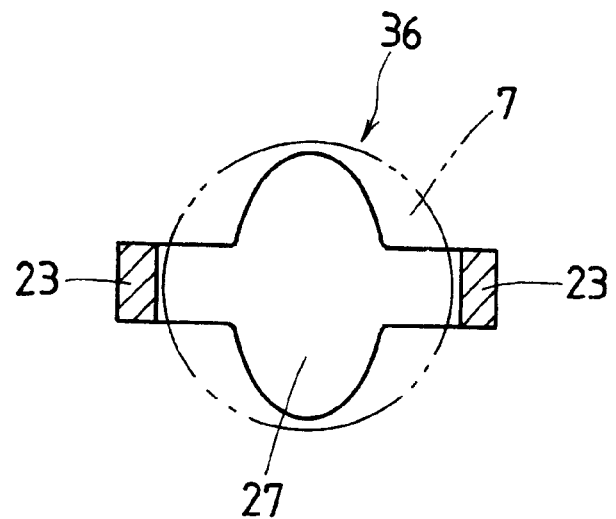
FIG. 11 is a cross-sectional view taken on the plane of the line III—III of FIG. 9.
Figure 12:
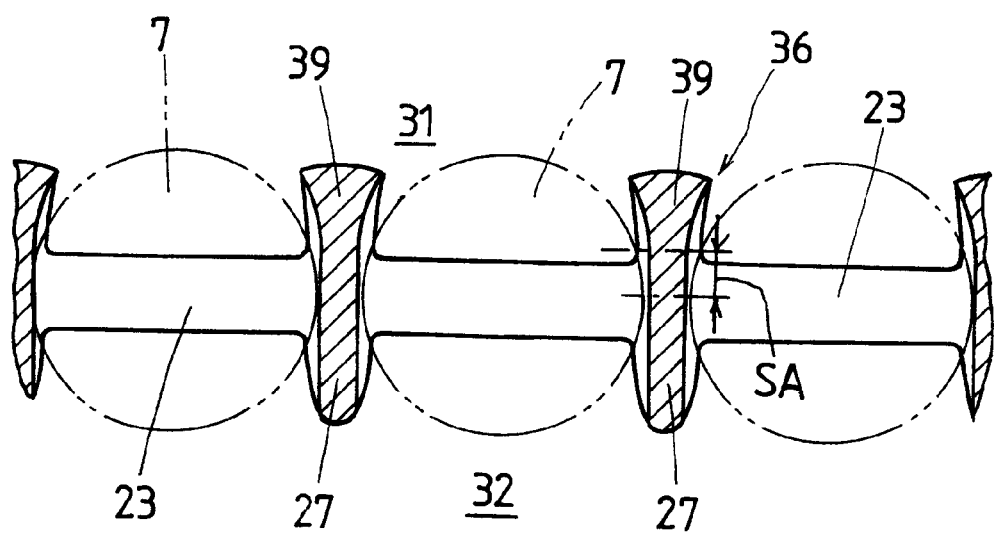
FIG. 12 is a cross-sectional view taken on the plane of the line IV—IV of FIG. 10.
Figure 13:
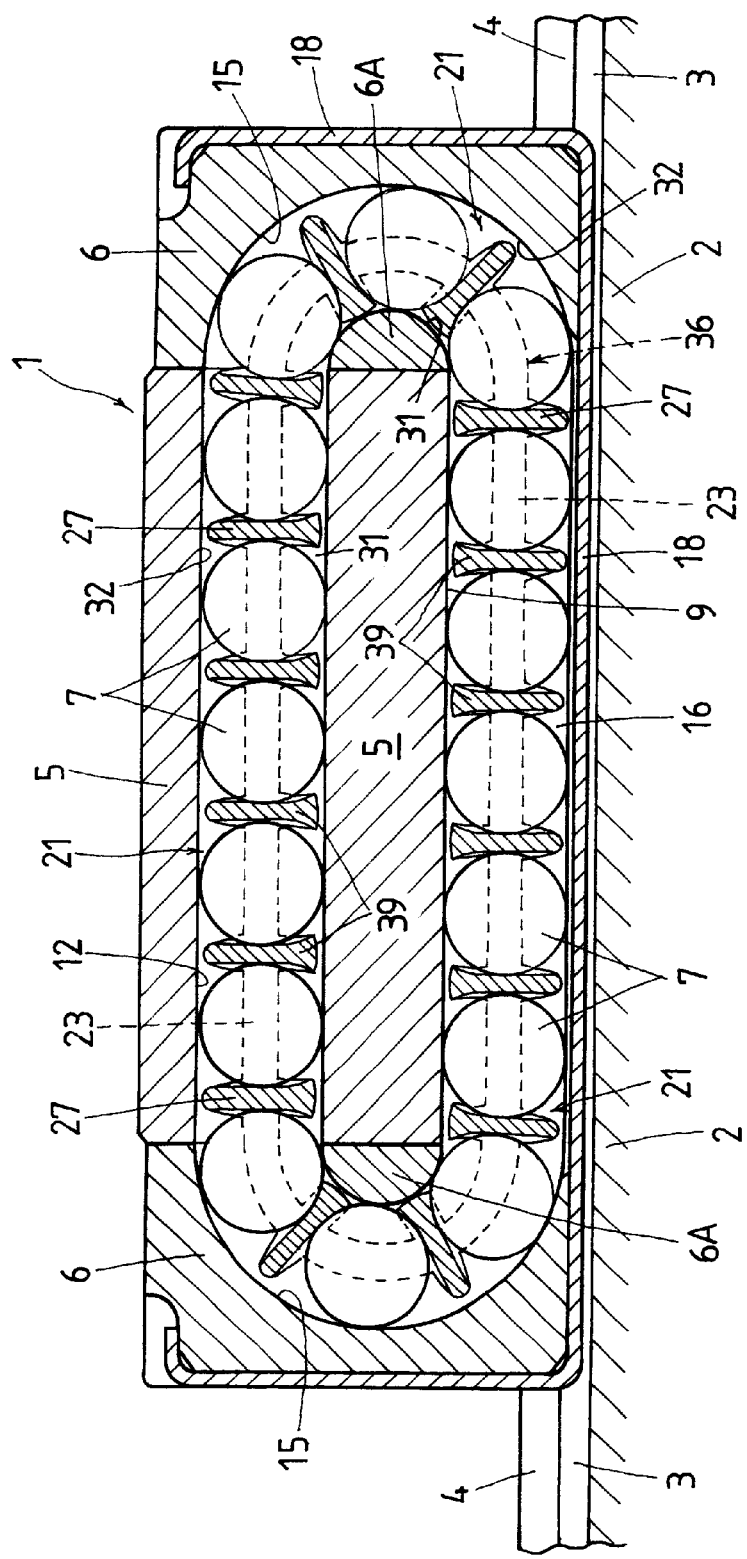
FIG. 13 is a view corresponding to a cross section taken along the plane of the line V—V of FIG. 2.

Since a coupler chain 36 explained later is substantially identical in construction and function with the coupler chains 26, 30 stated earlier, except that a separator 27 is modified in configuration at its innermost end near the radially inside surface of the turnaround 15, like parts or components are given like reference characters. The separator 27 is, as shown in FIG. 8, made thickened in cross section at its innermost end 39, compared with an area where the separator 27 will come into sliding contact the associated rolling element 7. With the configuration stated earlier, the separator 27 is less subject to wear at its innermost end 39 thereof, which might otherwise occur due to the sliding engagement with the radially inside surface 31 of the turnaround 15. To this end, the separator 2 flares out forward and aft at the innermost end 39 thereof to snugly conform to the associated rolling element 7 at a zone on the separator 27, which is radially inside the curve having the radius RS of curvature lying on the locus of the sliding contact point of the separator 27 with the associated rolling element 7 in the turnaround 15. Here, it should be noted that the zone on the separator 27 made increased in thickness in cross section is restricted within an area where any sliding contact point of the separator 27 with the associated rolling element 7 may not be expected to reach there. Forward and aft flares at the innermost end 39 of the separator 27 are formed to render concaved spherical surfaces 38 to the forward and aft surfaces on the innermost end 39 coming into rolling contact with the associated rolling elements 7, so that the flares are allowed to fit over and conform to the associated rolling elements 7 to make less the frictional resistance that might be encountered when the associated rolling elements 7 run. With the embodiment under explanation, there is arranged the retainer band 18 as shown in FIG. 13, while the end cap 6, 6A is, as with the embodiment stated first, made with a guide channel 34 shown in FIGS. 14 and 15 to lead the coupler member 23 along the curve having the radius RB of curvature.

A further another embodiment of coupler chain used in the linear motion guide unit will be explained hereinafter with reference to FIGS. 16 to 20.

Figure 20:
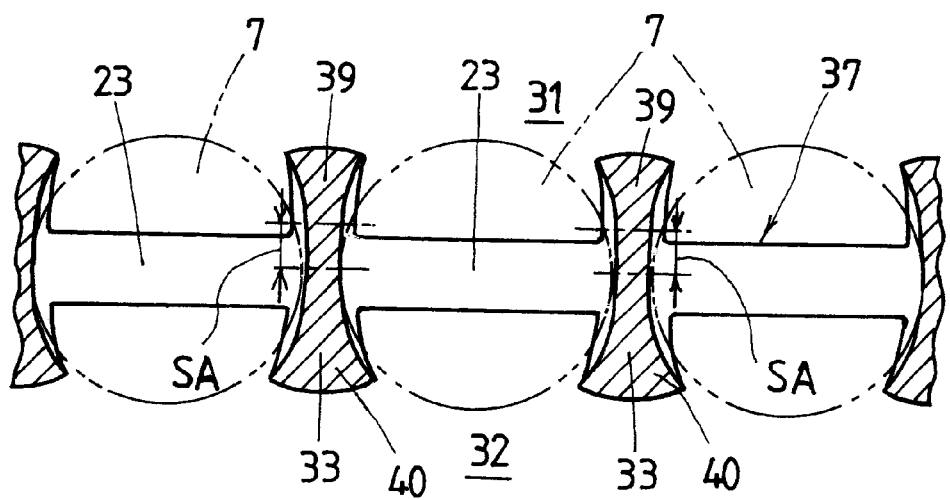
FIG. 20 is a cross-sectional view taken on the plane of the line VIII—VIII of FIG. 18.
Figure 21:
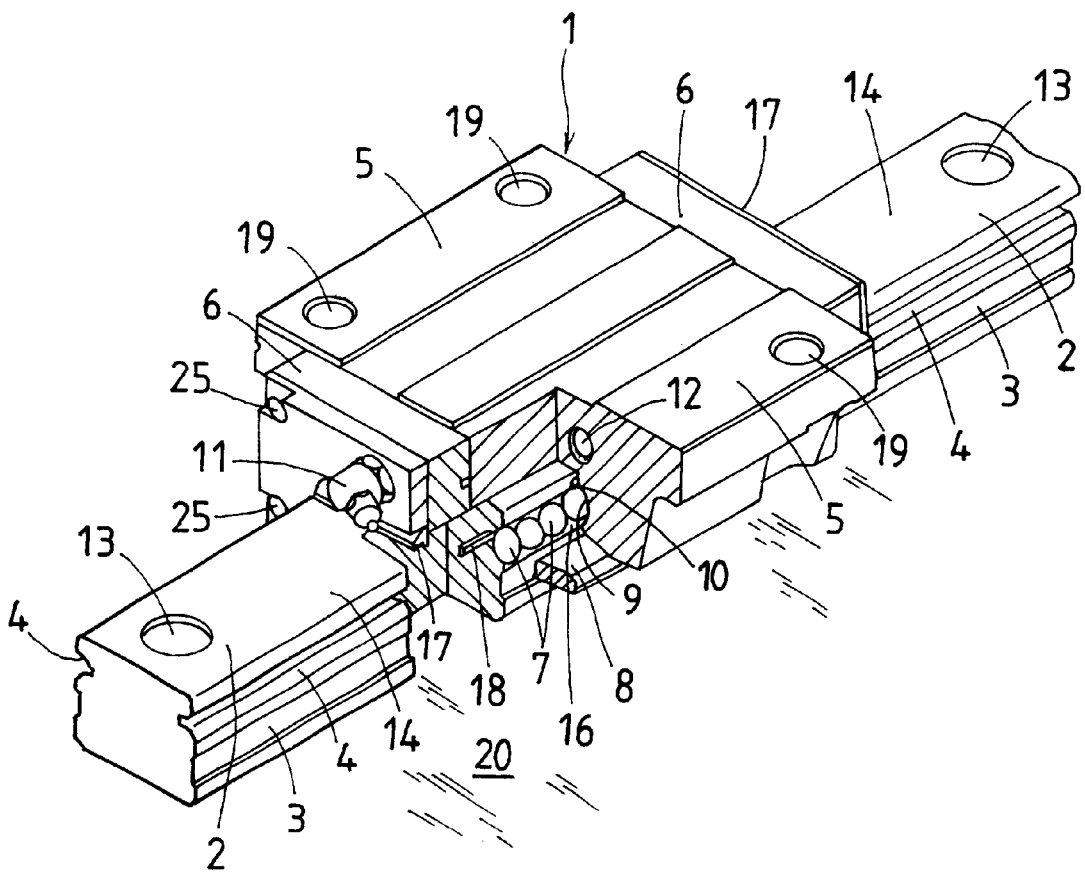
FIG. 21 is a partially cutaway perspective view showing a prior linear motion guide unit in which only rolling elements are incorporated in a circulating passage.

A coupler chain 37 explained later is substantially identical in construction and function with the coupler chains 26, 30 stated earlier, except that a separator 33 is modified in configuration at its innermost end 39 near the radially inside surface of the turnaround 15 and at its outermost end 40 near the radially outside surface of the turnaround 15. Thus, like parts or components are given like reference characters. Unlike the separator 22, 27 in the coupler chain 26, 30 stated earlier, the separator 33 in the coupler chain 37 is made thickened in cross section at both its innermost end 39 and outermost end 40, compared with other middle area in the separator 33. With the end configurations stated just above, the separator 33 is very tough to wear away even if the innermost end thereof will come into sliding engagement with the radially inside surface 31 of the turnaround 15 when the separator 33 moves ahead through the turnaround 15. On the other hand, the outermost end 40 of the separator 33 is formed to flare out forward and aft to fit over and conform to the associated rolling elements 7 on the widthwise outside 32 with respect to a locus of the rolling contact point of the separator 33 with the associated rolling element 7, which lies on a centerline IX—IX when the coupler chain 37 goes ahead straight as shown in FIG. 20. Here, it should be noted that the forward and aft flares at the innermost end 39 of the separator 33, like the innermost end 39 of the separator 27 stated above, are restricted to ensure the radial zone SA extending radially inwardly toward the radially inside surface 31 of the turnaround 15 and kept even in thickness in cross section, over which a sliding contact point thereof with the associated rolling element 7 changes places towards the radially inside curvilinear surface 31 in the turnaround 15 as depicted at from S1 to S12 for the separator 27 in the embodiment stated first. Thus, the zones on the separator 33 made increased in thickness in cross section rather than the radial zone SA are limited within areas where any sliding contact point of the separator 33 with the associated rolling element 7 may not be expected to reach there. Forward and aft flares at the innermost end 39 and the outermost end 40 of the separator 33 are formed to render concaved spherical surfaces 38 and 48 to the forward and aft surfaces on the innermost end 39 and the outermost end 40 coming into rolling contact with the associated rolling elements 7, so that the flares are allowed to fit over and conform to the associated rolling elements 7 to make less the frictional resistance that might be encountered when the associated rolling elements 7 run. With the separator 33 stated now, the flared outermost end 40 may certainly come into sliding contact with the retainer band 18 and, therefore, the coupler chain 37 is kept in place even after the slider 1 has been disassembled from the track rail 2, whereby the rolling elements 7 are kept against falling out of the slider 1. The retainer band 18 is also installed in the last embodiment stated here.

What is claimed is:

1. A linear motion guide unit with a separator coupler, comprising a track rail, a slider movable with respect to the track rail and including therein a recirculating passage composed of a linear passage and a curvilinear passage connected to each other, the recirculating passage having incorporated with rolling elements, separators each interposed between any two adjoining rolling elements, and a coupler member connecting the separators to one another, the separator being made even in thickness at a zone over which a sliding contact point thereof with the associated rolling element changes place when the separator moves through the curvilinear passage, the coupler member being made in the form of a strip kept substantially constant in cross section throughout the overall length to bend uniformly with a fixed radius of curvature when moving in the curvilinear passage, and wherein the coupler member in the curvilinear passage travels along a desired curve having a radius of curvature, which is less than a radius of curvature of a locus of center of the rolling element, but larger than a radius of curvature of a locus of the sliding contact point of the separator with the associated rolling element, which will change place when the separator moves through the curvilinear passage.

2. A linear motion guide unit with a separator coupler constructed as defined in claim 1, wherein the slider includes therein a carriage and end caps attached to forward and aft ends of the carriage, each to each end, the linear passage is composed of a load raceway defined between a raceway groove formed in the carriage and a raceway groove formed on the track rail, and a return passage made in the carriage in parallel with the load raceway, and the curvilinear passage is composed of turnarounds formed in the end caps, each to each cap.

3. A linear motion guide unit with a separator coupler constructed as defined in claim 1, wherein the separator coupler is composed of a pair of coupler members arranged to flank on radially opposite sides of any rolling element, each to each side, and joined together with the separators.

4. A linear motion guide unit with a separator coupler constructed as defined in claim 1, wherein the rolling element is a ball, and the coupler members arranged to flank on radially opposite sides of any rolling element define, in combination with any two adjacent separators, substantially round windows to accommodate therein the balls, each in each window.

5. A linear motion guide unit with a separator coupler constructed as defined in claim 1, wherein the rolling element is any one of a ball and a roller, and the coupler members arranged to flank on radially opposite sides of any rolling element define, in combination with any two adjacent separators, substantially rectangular windows to accommodate therein the rolling elements, each in each window.

6. A linear motion guide unit with a separator coupler constructed as defined in claim 1, wherein the separators extend radially inwardly of the curvilinear passage, with ranging from a place lying on the desired curve for the coupler member to an innermost end thereof coming into sliding engagement with a radially inside surface of the curvilinear passage, thereby helping ensure that the coupler member travels along the desired curve throughout the curvilinear passage.

7. A linear motion guide unit with a separator coupler constructed as defined in claim 1, wherein the separators each have inside and outside parts that extend in radially opposite direction of the curvilinear passage in symmetry with respect to a lengthwise centerline of the coupler member.

8. A linear motion guide unit with a separator coupler constructed as defined in claim 1, wherein the separators are each made even in thickness in cross section throughout an overall width spanning between a radially inside surface and a radially outside surface in the recirculating passage.

9. A linear motion guide unit with a separator coupler constructed as defined in claim 1, wherein the separators are each made thickened in cross section only at an innermost end thereof near the radially inside surface in the recirculating passage, compared with other residual area of the separator.

10. A linear motion guide unit with a separator coupler constructed as defined in claim 1, wherein the separators are each made thickened in cross section not only at an innermost end thereof near the radially inside surface in the recirculating passage, but also at an outermost end thereof near the radially outside surface in the recirculating passage in such a configuration fitting over and conforming to the associated rolling element, with leaving a zone over which a sliding contact point thereof with the associated rolling element changes place when the separator moves through the curvilinear passage.

11. A linear motion guide unit with a separator coupler constructed as defined in claim 1, wherein there is provided a retainer band to keep in place not only the rolling elements but also a coupler chain of the coupler member connected with the separators against falling out of the slider even after the slider has been disassembled from the track rail.

* * * * *